(12) United States Patent
Kuriki et al.

(10) Patent No.: US 9,543,577 B2
(45) Date of Patent: Jan. 10, 2017

(54) ACTIVE MATERIAL, ELECTRODE INCLUDING THE ACTIVE MATERIAL AND MANUFACTURING METHOD THEREOF, AND SECONDARY BATTERY

(75) Inventors: Kazutaka Kuriki, Kanagawa (JP); Mitsuhiro Ichijo, Kanagawa (JP); Toshiya Endo, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 106 days.

(21) Appl. No.: 13/307,052

(22) Filed: Nov. 30, 2011

(65) Prior Publication Data
US 2012/0156556 A1 Jun. 21, 2012

(30) Foreign Application Priority Data
Dec. 16, 2010 (JP) ................... 2010-280754

(51) Int. Cl.
*H01M 4/36* (2006.01)
*H01M 4/04* (2006.01)
(Continued)

(52) U.S. Cl.
CPC ........... *H01M 4/366* (2013.01); *H01M 4/0428* (2013.01); *H01M 4/134* (2013.01); *H01M 4/1395* (2013.01); *H01M 4/386* (2013.01); *H01M 4/48* (2013.01); *H01M 4/661* (2013.01); *Y02E 60/122* (2013.01); *Y02P 70/54* (2015.11)

(58) Field of Classification Search
None
See application file for complete search history.

(56) References Cited

U.S. PATENT DOCUMENTS 5,989,943 A * 11/1999 Whitten et al. ............... 438/131
6,685,804 B1 2/2004 Ikeda et al.
(Continued)

FOREIGN PATENT DOCUMENTS

JP 2001-210315 A 8/2001
JP 2002-083594 A 3/2002
(Continued)

OTHER PUBLICATIONS

Yamamura (JP, 2009-087891) (a raw machine translation) (Abstract, Detailed Description and Drawings) (Apr. 23, 2009).*

(Continued)

*Primary Examiner* — Miriam Stagg
*Assistant Examiner* — Carmen Lyles-Irving
(74) *Attorney, Agent, or Firm* — Nixon Peabody LLP; Jeffrey L. Costellia

(57) ABSTRACT

An electrode in which a silicon layer is provided over a current collector, a thin film layer having a thickness within a certain range is provided on a surface of the silicon layer, and the thin film layer contains fluorine, is used for a power storage device. The thickness of the thin film layer containing fluorine is greater than 0 nm and less than or equal to 10 nm, preferably greater than or equal to 4 nm and less than or equal to 9 nm. The fluorine concentration of the thin film layer containing fluorine is preferably as high as possible, and the nitrogen concentration, the oxygen concentration, and the hydrogen concentration thereof are preferably as low as possible.

11 Claims, 11 Drawing Sheets

(51) Int. Cl.
  *H01M 4/134* (2010.01)
  *H01M 4/1395* (2010.01)
  *H01M 4/38* (2006.01)
  *H01M 4/48* (2010.01)
  *H01M 4/66* (2006.01)

(56) References Cited

U.S. PATENT DOCUMENTS

| | | | |
|---|---|---|---|
| 6,887,511 B1 | 5/2005 | Shima et al. | |
| 7,192,673 B1 | 3/2007 | Ikeda et al. | |
| 7,235,330 B1 | 6/2007 | Fujimoto et al. | |
| 7,241,533 B1 | 7/2007 | Ikeda et al. | |
| 7,402,829 B2 | 7/2008 | Green | |
| 7,410,728 B1 | 8/2008 | Fujimoto et al. | |
| 7,683,359 B2 | 3/2010 | Green | |
| 7,794,881 B1 | 9/2010 | Fujimoto et al. | |
| 7,842,535 B2 | 11/2010 | Green | |
| 8,017,430 B2 | 9/2011 | Green | |
| 8,455,044 B2 | 6/2013 | Yokoi et al. | |
| 2007/0007239 A1 | 1/2007 | Lee et al. | |
| 2008/0206651 A1 | 8/2008 | Kawase et al. | |
| 2008/0233478 A1 | 9/2008 | Hirose et al. | |
| 2009/0148778 A1 | 6/2009 | Kawase et al. | |
| 2009/0162750 A1* | 6/2009 | Kawakami et al. | 429/218.1 |
| 2009/0214944 A1 | 8/2009 | Rojeski | |
| 2009/0226821 A1* | 9/2009 | Ihara et al. | 429/338 |
| 2010/0124707 A1* | 5/2010 | Hirose et al. | 429/331 |
| 2010/0319188 A1 | 12/2010 | Yamazaki et al. | |
| 2011/0027655 A1 | 2/2011 | Rojeski | |
| 2011/0143195 A1 | 6/2011 | Ito et al. | |
| 2011/0151290 A1 | 6/2011 | Cui et al. | |
| 2011/0212363 A1 | 9/2011 | Yamazaki et al. | |
| 2011/0236753 A1 | 9/2011 | Kuriki et al. | |
| 2011/0236757 A1 | 9/2011 | Yukawa et al. | |
| 2011/0266654 A1 | 11/2011 | Kuriki et al. | |
| 2011/0289767 A1 | 12/2011 | Yamazaki | |
| 2011/0292564 A1 | 12/2011 | Yamazaki | |
| 2011/0294005 A1 | 12/2011 | Kuriki et al. | |
| 2011/0294011 A1 | 12/2011 | Kuriki et al. | |
| 2011/0300445 A1 | 12/2011 | Murakami et al. | |
| 2011/0305950 A1 | 12/2011 | Kuriki et al. | |
| 2012/0003383 A1 | 1/2012 | Furuno | |
| 2012/0003530 A1 | 1/2012 | Kuriki et al. | |
| 2012/0003807 A1 | 1/2012 | Furuno et al. | |
| 2012/0015247 A1 | 1/2012 | Yoshida | |
| 2012/0070738 A1 | 3/2012 | Yoshida | |

FOREIGN PATENT DOCUMENTS

| | | |
|---|---|---|
| JP | 2002-237294 A | 8/2002 |
| JP | 2003-246700 A | 9/2003 |
| JP | 2004-281317 A | 10/2004 |
| JP | 2005-011696 A | 1/2005 |
| JP | 2006-505901 | 2/2006 |
| JP | 2008-512838 | 4/2008 |
| JP | 2008-103148 A | 5/2008 |
| JP | 2008-270154 A | 11/2008 |
| JP | 2009-038001 A | 2/2009 |
| JP | 2009-087891 | 4/2009 |
| JP | 2009-289586 A | 12/2009 |
| JP | 2012-009414 A | 1/2012 |
| WO | WO-2006/028316 | 3/2006 |
| WO | WO-2009/108731 | 9/2009 |
| WO | WO-2011/001620 | 1/2011 |
| WO | WO-2011/136028 | 11/2011 |

OTHER PUBLICATIONS

Cui.L et al., "Crystalline-Amorphous Core-Shell Silicon Nanowires for High Capacity and High Current Battery Electrodes", Nano Letters, 2009, vol. 9, No. 1, pp. 491-495.

Kamins.T et al., "Ti-catalyzed Si nanowires by chemical vapor deposition: Microscopy and growth mechanisms", J. Appl. Phys. (Journal of Applied Physics), Jan. 15, 2001, vol. 89, No. 2, pp. 1008-1016.

Kohno.H et al., "Silicon Nanoneedles Grown by a Simple Thermal Treatment Using Metal-Sulfur Catalysts", Jpn. J. Appl. Phys. (Japanese Journal of Applied Physics), Feb. 1, 2002, vol. 41, No. 2A, pp. 577-578.

* cited by examiner

200

302  304

300

ACTIVE MATERIAL, ELECTRODE INCLUDING THE ACTIVE MATERIAL AND MANUFACTURING METHOD THEREOF, AND SECONDARY BATTERY

BACKGROUND OF THE INVENTION

1. Field of the Invention

The present invention relates to an active material, an electrode including the active material and a manufacturing method thereof, and a secondary battery.

2. Description of the Related Art

In recent years, with the advance of environmental technology, development of power generation devices (e.g., solar power generation devices) which pose less burden on the environment than conventional power generation methods has been actively conducted. Concurrently with the development of power generation devices, development of power storage devices has also been underway.

As an example of a power storage device, a lithium ion battery can be given. Lithium ion batteries have been widely used because they have high energy density and are thus suitable for reduction in size. As a negative electrode material of a lithium ion battery, a material in/from which lithium ions can be inserted and extracted is preferably used. Although graphite, silicon, and the like can be given as examples of such a material, silicon is especially preferred. This is because silicon has about ten times as high theoretical capacity as graphite and thus is expected to be a host material of lithium (e.g., Patent Document 1).

REFERENCE

Patent Document

[Patent Document 1] Japanese Translation of PCT International Application No. 2006-505901

SUMMARY OF THE INVENTION

However, in the case where an electrolyte solution containing fluorine (for example, a mixture solution of ethylene carbonate and diethyl carbonate, in which $LiPF_6$ is dissolved) is used as an electrolyte solution of the lithium ion battery and an active material layer is formed using silicon, a covering film is formed on a surface of the active material layer as a result of charge and discharge. This covering film becomes thicker as charge and discharge are repeated, and causes degradation in cycle characteristics of the power storage device.

An object of one embodiment of the present invention is to realize favorable cycle characteristics of a power storage device (e.g., a secondary battery) even in the case where an active material layer is formed using silicon and an electrolyte solution containing fluorine (e.g., an electrolyte solution in which $LiPF_6$ is dissolved) is used.

One embodiment of the present invention is an active material, in which a thin film layer having a thickness within a predetermined range is provided on a surface of a silicon layer, and the thin film layer contains fluorine. Note that in this specification, the term "silicon layer" refers to a layer containing silicon as a main component.

One embodiment of the present invention is an active material including a thin film layer containing fluorine with a thickness of greater than 0 nm and less than or equal to 10 nm over a silicon layer.

In the above active material, the thin film layer preferably has a thickness of greater than or equal to 4 nm and less than or equal to 9 nm. When the thickness of the thin film layer is greater than or equal to 4 nm and less than or equal to 9 nm, deterioration rate can be suppressed to lower than 40%.

In the above active material, the thin film layer can be a silicon oxide layer.

In the above active material, the silicon layer preferably contains phosphorus so that the conductivity of the active material is increased.

In the above active material, the fluorine concentration of the thin film layer is preferably $5.0 \times 10^{19}$ atoms·cm$^{-3}$ or higher.

In the above active material, the thin film layer preferably contains nitrogen, and the nitrogen concentration thereof is preferably $6.0 \times 10^{20}$ atoms·cm$^{-3}$ or lower.

One embodiment of the present invention is an electrode including a layer of the above active material over a current collector.

One embodiment of the present invention is a secondary battery including a positive electrode, a negative electrode to which the above electrode is applied, and an electrolyte solution containing fluorine.

In the above secondary battery, titanium can be used as a material of the current collector, for example.

In the above secondary battery, the electrolyte solution containing fluorine preferably contains lithium.

One embodiment of the present invention is a manufacturing method of an electrode including the steps of forming a silicon layer over a current collector by a CVD method using a first deposition gas, and forming a thin film layer containing fluorine over the silicon layer by a CVD method using a second deposition gas containing fluorine.

In the above manufacturing method of an electrode, $SiF_4$ is preferably used as the second deposition gas containing fluorine.

In the above manufacturing method of an electrode, the first deposition gas is preferably $SiF_4$.

In the above manufacturing method of an electrode, the first deposition gas preferably contains phosphorus.

Note that the present invention is not limited to these embodiments. For example, in the case where the active material layer is a silicon layer, it may include a crystalline silicon region and a whisker-like crystalline silicon region having a plurality of protrusions projecting upward from the crystalline silicon region. Further, an amorphous silicon region may be provided in contact with the crystalline silicon region. The whisker-like crystalline silicon region may include a bent or branched portion.

Alternatively, a slurry may be formed by mixing an active material including a thin film layer containing fluorine, a conduction auxiliary agent, a binder, and a solvent, and the slurry may be provided over a coated electrode formed over a current collector.

Even in the case where a silicon electrode is employed and an electrolyte solution containing fluorine (e.g., an electrolyte solution in which $LiPF_6$ is dissolved) is used, an active material layer which can realize favorable cycle characteristics of a secondary battery can be obtained, and a secondary battery with favorable cycle characteristics can be obtained.

DETAILED DESCRIPTION OF THE INVENTION

Figure 1:
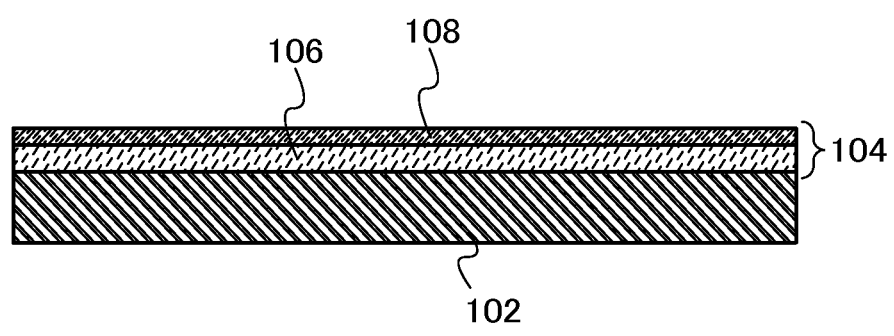
FIG. 1 schematically illustrates an electrode of a secondary battery according to one embodiment of the present invention.

Hereinafter, embodiments and examples of the present invention will be described with reference to the drawings. However, the present invention is not limited to the following description. It will be readily appreciated by those skilled in the art that various changes and modifications are possible without departing from the spirit and the scope of the present invention. Therefore, the present invention is not construed as being limited to the following description of the embodiments and examples. Note that reference numerals denoting the same portions are commonly used in different drawings in describing the structure of the present invention.

Embodiment 1

In this embodiment, an electrode of a secondary battery, which is one embodiment of the present invention, and a manufacturing method thereof will be described.

FIG. 1 is a schematic view of the electrode which is one embodiment of the present invention. An electrode 100 illustrated in FIG. 1 includes at least a current collector 102 and an active material layer 104 provided over the current collector 102. The active material layer 104 includes a silicon layer 106 and a thin film layer 108 containing fluorine provided in contact with the silicon layer 106.

The current collector 102 may be formed using a conductive material having a foil shape, a plate shape, or a net shape, and may be a conductive film. As the conductive film, a Pt film, an Al film, a Cu film, or a Ti film can be used, for example. Alternatively, an Al alloy film to which Si, Ti, Nd, Sc, Mo, or the like is added may be used. Such a conductive film can be formed by a sputtering method, an evaporation method, a printing method, an inkjet method, a CVD method (a plasma CVD method, a thermal CVD method, or an LPCVD method), or the like.

The silicon layer 106 that is provided over the current collector 102 may be formed by a sputtering method, an evaporation method, a CVD method (a plasma CVD method, a thermal CVD method, or an LPCVD method), or the like.

Note that the silicon layer 106 preferably contains an impurity element which imparts one conductivity type. This is because the conductivity of the silicon layer 106 can be improved when an impurity element which imparts one conductivity type is contained. As an impurity element which imparts one conductivity type, phosphorus (P), arsenic (As), boron (B), and the like can be given; however, P is preferably used. The conductivity is increased by addition of P. The above silicon layer to which P is added is preferable because it is widely used in polysilicon electrodes and the like of semiconductor devices and thus can be formed using devices generally used in semiconductor manufacturing processes.

The thin film layer 108 containing fluorine provided in contact with the silicon layer 106 has a thickness of 10 nm or less, preferably greater than or equal to 4 nm and less than or equal to 9 nm. When the thickness of the thin film layer 108 containing fluorine is greater than or equal to 4 nm and less than or equal to 9 nm, the deterioration rate can be suppressed to lower than 40% as described in Example below.

When the thickness of the thin film layer 108 containing fluorine is greater than 10 nm, the resistance between the electrode and an electrolyte solution is increased. Thus, the thickness of the thin film layer 108 containing fluorine is preferably 10 nm or less.

The thin film layer 108 containing fluorine preferably contains silicon as its main component. In the case of containing silicon as its main component, the thin film layer 108 containing fluorine may be formed by a CVD method (a plasma CVD method, a thermal CVD method, or an LPCVD method) with the use of an $SiF_4$ gas.

As such a thin film layer 108 containing fluorine, for example, a silicon layer containing fluorine or a silicon oxide layer containing fluorine can be used. The silicon layer containing fluorine or the silicon oxide layer containing fluorine may be formed by a sputtering method, an evaporation method, a CVD method (a plasma CVD method, a thermal CVD method, or an LPCVD method), or the like.

Moreover, as described in Example below, the fluorine concentration of the thin film layer 108 containing fluorine is preferably $5.0 \times 10^{19}$ atoms·cm$^{-3}$ or higher, and the nitrogen concentration thereof is preferably $6.0 \times 10^{20}$ atoms·cm$^{-3}$ or lower, further preferably $1.0 \times 10^{21}$ atoms·cm$^{-3}$ or lower.

Note that the fluorine concentration is preferably as high as possible and the nitrogen concentration and the oxygen concentration are preferably as low as possible. The hydrogen concentration is preferably as low as possible, specifically, $1.0 \times 10^{20}$ atoms·cm$^{-3}$ or lower.

The above-described electrode of this embodiment can have favorable cycle characteristics even in the case where an electrolyte solution containing fluorine (e.g., an electrolyte solution in which $LiPF_6$ is dissolved) is used.

Embodiment 2

In this embodiment, an electrode, which is one embodiment of the present invention, serving as a negative electrode of a secondary battery and a manufacturing method thereof, which are different from those in Embodiment 1, will be described with reference to FIG. 2 and FIGS. 3A and 3B.

Figure 2:
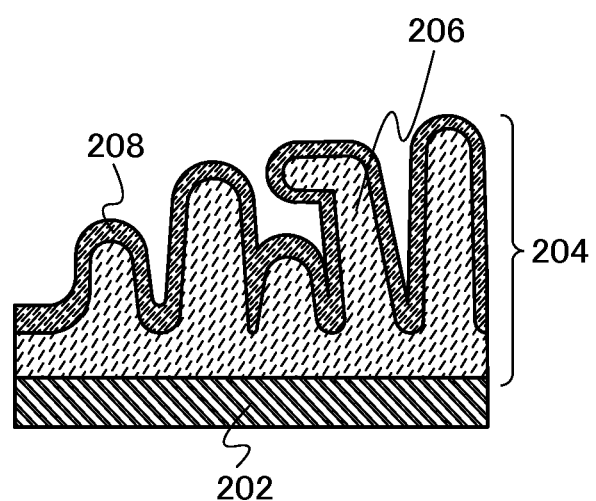
FIG. 2 schematically illustrates an electrode of a secondary battery according to one embodiment of the present invention.

FIG. 2 illustrates one mode of the electrode of this embodiment. An electrode 200 illustrated in FIG. 2 includes at least a current collector 202 and an active material layer 204. The active material layer 204 includes a silicon layer 206 provided on one surface of the current collector 202, and a thin film layer 208 containing fluorine provided over the silicon layer 206. Note that the silicon layer 206 includes a crystalline silicon region 206a and a whisker-like crystalline silicon region 206b which is provided over the crystalline silicon region 206a (FIG. 3B).

Next, a manufacturing method of the electrode illustrated in FIG. 2 will be described with reference to FIGS. 3A and 3B.

Figure 3A:
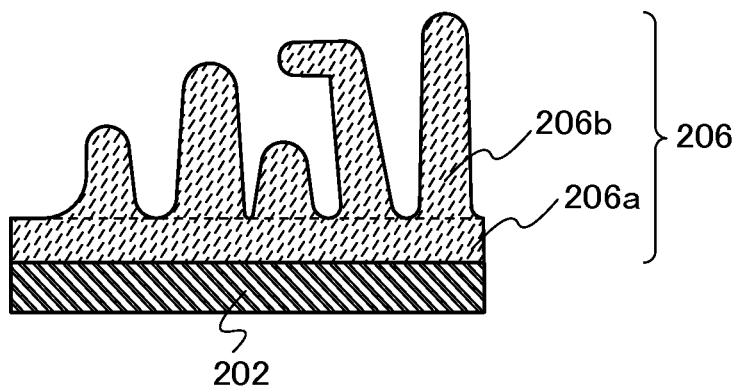
FIGS. 3A and 3B illustrate a manufacturing method of an electrode of a secondary battery according to one embodiment of the present invention.

First, as illustrated in FIG. 3A, a crystalline silicon layer is formed over the current collector 202 by an LPCVD method, to serve as the silicon layer 206. The formation of crystalline silicon by the LPCVD method is preferably performed at a temperature higher than or equal to 550° C. and lower than or equal to the upper temperature limit of each of an LPCVD apparatus and the current collector 202, further preferably higher than or equal to 580° C. and lower than or equal to 650° C. As a source gas, a deposition gas containing silicon can be used. Note that one or more of a rare gas such as helium, neon, argon, and xenon; nitrogen; and hydrogen may be mixed to the source gas.

As the current collector 202, the current collector 102 in Embodiment 1 can be used.

Note that the silicon layer 206 may contain oxygen as an impurity. The oxygen contained in the silicon layer 206 as an impurity is oxygen which is desorbed from a quartz chamber of the LPCVD apparatus by the heating performed in the formation of the crystalline silicon layer by the LPCVD method, and diffused into the crystalline silicon layer.

As in Embodiment 1, an impurity element which imparts one conductivity type may be added to the silicon layer 206.

The silicon layer 206 includes a crystalline silicon region 206a and a whisker-like crystalline silicon region 206b provided over the crystalline silicon region 206a. Note that the interface between the crystalline silicon region 206a and the whisker-like crystalline silicon region 206b is not clear. Therefore, a plane that is at the same level as the bottom of the deepest valley among valleys formed between plural protrusions in the whisker-like crystalline silicon region 206b and is parallel to a surface of the current collector 202 is regarded as the interface between the crystalline silicon region 206a and the whisker-like crystalline silicon region 206b.

The crystalline silicon region 206a is provided so as to cover the current collector 202. The whisker-like crystalline silicon region 206b includes a plurality of protrusions which grow in random directions from random positions of the crystalline silicon region 206a.

Note that the plurality of protrusions included in the whisker-like crystalline silicon region 206b may each have a columnar shape such as a cylinder shape or a prism shape, or a needle shape such as a cone shape or a pyramid shape. The top of the protrusion may be rounded. The plurality of protrusions may include both a columnar protrusion and a needle-like protrusion. Further, a surface of each of the protrusions may be uneven. The surface unevenness of the protrusions can increase the surface area of the silicon layer 206.

In the electrode described in this embodiment, the crystalline silicon layer functioning as an active material layer includes the whisker-like crystalline silicon region 206b, so that the electrode has a large surface area and high current density; thus, the discharge capacity and charge capacity of the power storage device can be increased.

Figure 3B:
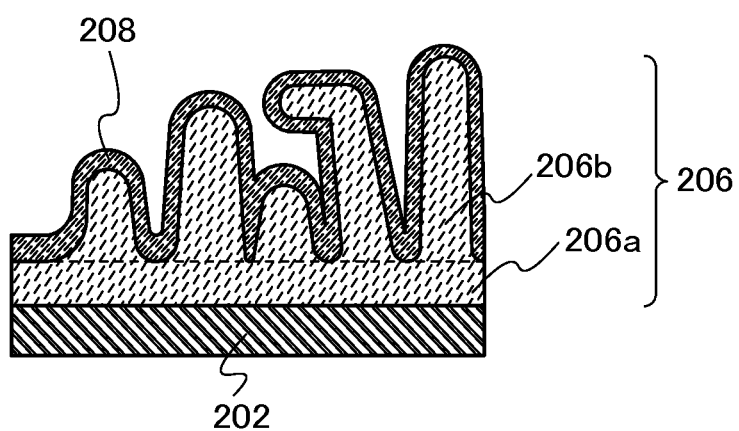

Next, as illustrated in FIG. 3B, the thin film layer 208 containing fluorine is formed over the silicon layer 206. In this manner, the electrode of this embodiment is completed.

The above-described electrode of this embodiment can have favorable cycle characteristics even in the case where an electrolyte solution containing fluorine (e.g., an electrolyte solution in which $LiPF_6$ is dissolved) is used. Further, the crystalline silicon layer has a whisker-like shape, so that the electrode has a large surface area and high current density; thus, the discharge capacity and charge capacity of the power storage device can be increased.

Embodiment 3

Figure 4:
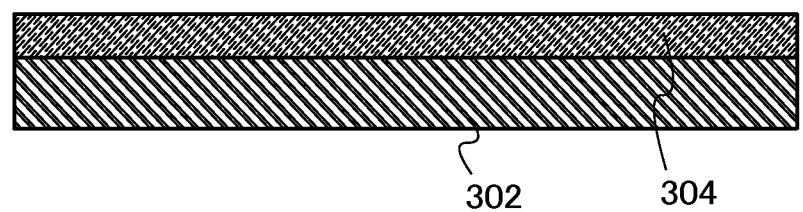
FIG. 4 schematically illustrates an electrode of a secondary battery according to one embodiment of the present invention.

In this embodiment, an electrode, which is one embodiment of the present invention, serving as a negative electrode of a secondary battery and a manufacturing method thereof, which are different from those in Embodiments 1 and 2, will be described with reference to FIG. 4.

First, an active material, a conduction auxiliary agent, a binder, and a solvent are mixed to form a slurry. The slurry is prepared in such a manner that the conduction auxiliary agent is dispersed in the solvent containing the binder and then the active material is mixed therein. At this time, in order to improve the dispersion property, it is preferable to reduce the amount of the solvent so that a thick paste is obtained. After that, the solvent is added and the slurry is formed. The proportions of the active material, the conduction auxiliary agent, the binder, and the solvent can be adjusted as appropriate; the battery performance per the amount of the active material can be improved when the proportions of the conduction auxiliary agent and the binder are increased.

As the active material, a material that can be alloyed with lithium is preferably used; for example, a material containing silicon, tin, aluminum, or germanium can be used. In this embodiment, granular silicon is used. Note that favorable capacity and cycle characteristics can be obtained when the grain diameter of the granular silicon serving as the active material is small, and the grain diameter is preferably 100 nm or less.

In this embodiment, a thin film layer containing fluorine is formed to cover the surface of each granular silicon particle. The thin film layer containing fluorine can be formed in a manner similar to that in Embodiment 1.

As the conduction auxiliary agent, a material which is itself an electron conductor and does not chemically react with other materials in a battery device may be used. As examples of the conduction auxiliary agent, carbon-based materials such as graphite, carbon fiber, carbon black, acetylene black, Ketjenblack, and VGCF (registered trademark); metal materials such as copper, nickel, aluminum, and silver; and powder, fiber, and the like of mixtures thereof can be given. The conduction auxiliary agent is a material that assists conduction between active materials; it is provided between active materials which are apart from each other and enables conduction between the active materials.

As the binder, a polysaccharide, a thermoplastic resin, a polymer with rubber elasticity, and the like can be given. Examples thereof include starch, polyimide, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene-diene monomer (EPDM), sulfonated EPDM, styrene-butadiene rubber (SBR), butadiene rubber, fluororubber, and polyethylene oxide.

As examples of the solvent, water, N-methyl-2-pyrrolidone, lactic acid ester, and the like can be given.

Next, the slurry formed above is applied over a current collector 302 and dried using a hot plate, an oven, or the like. The drying can be performed at approximately 50° C. in the case of using an aqueous binder such as SBR. In the case of using an organic binder such as PVdF or polyimide, the drying is preferably performed at approximately 120° C. After that, punching is performed so that a desired shape is obtained, and main drying is performed. The main drying is preferably performed at approximately 170° C. for approximately 10 hours. In this manner, a slurry layer 304 is formed over the current collector 302.

As the current collector 302, for example, a copper foil, a titanium foil, or a stainless steel foil can be used. There is no particular limitation on the shape of the current collector 302, and a foil shape, a plate shape, a net shape, or the like can be used.

An electrode 300 of this embodiment, which is described above, includes the slurry layer 304 over the current collector 302, and can have favorable cycle characteristics even in the case where an electrolyte solution containing fluorine (e.g., an electrolyte solution in which $LiPF_6$ is dissolved) is used.

Embodiment 4

In this embodiment, a power storage device which is one embodiment of the present invention will be described. The power storage device of this embodiment is a secondary battery or a capacitor in which any of the electrodes in Embodiments 1 to 3 is used as a negative electrode.

Figure 5A:
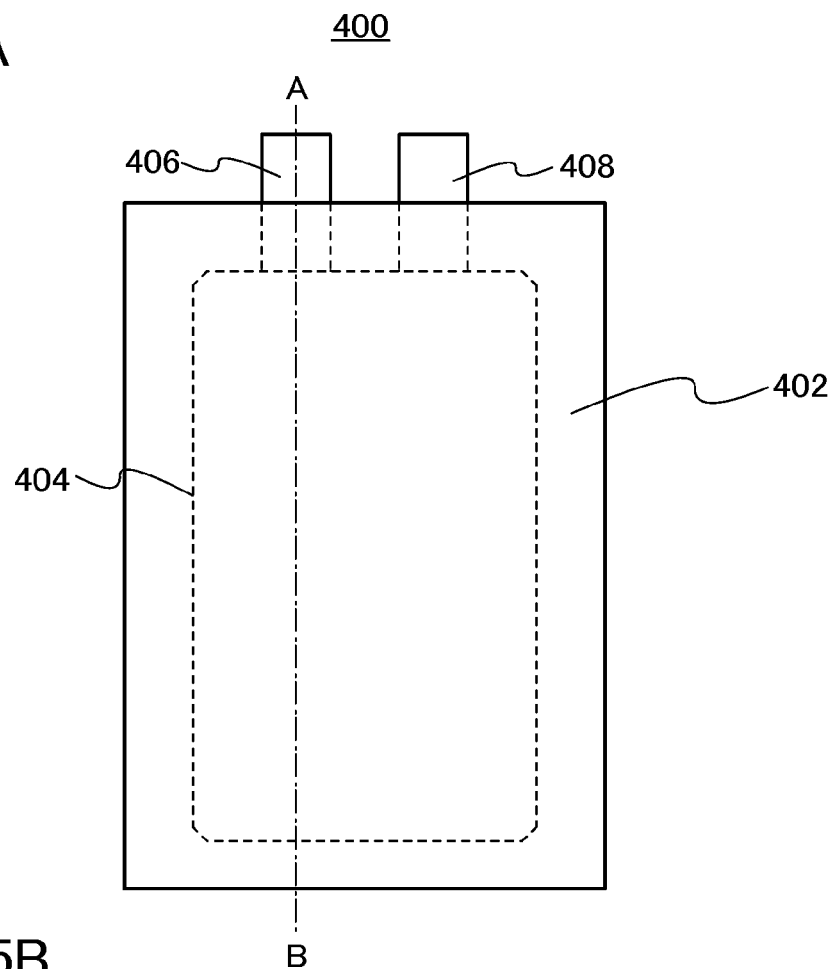
FIGS. 5A and 5B schematically illustrate a secondary battery according to one embodiment of the present invention.
Figure 5B:
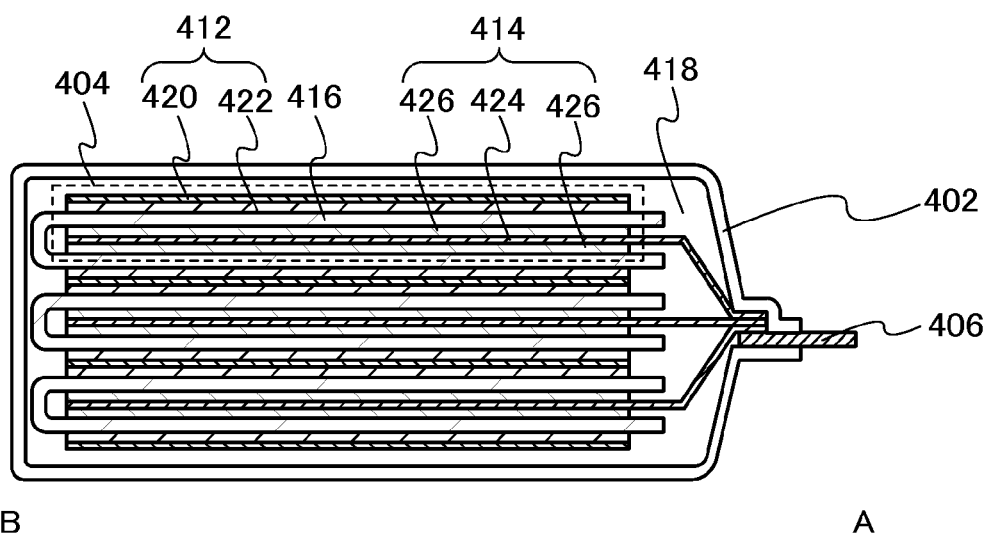

FIG. 5A is a plan view of a power storage device 400 which is a secondary battery of this embodiment, and FIG. 5B is a cross-sectional view taken along dashed-dotted line A-B in FIG. 5A.

The power storage device 400 illustrated in FIG. 5A includes a power storage cell 404 inside an exterior member 402, and a terminal portion 406 and a terminal portion 408 which are connected to the power storage cell 404. For the exterior member 402, a polymer film, a metal film, a metal case, a plastic case, or the like can be used.

As illustrated in FIG. 5B, the power storage cell 404 includes a negative electrode 412, a positive electrode 414, a separator 416 between the negative electrode 412 and the positive electrode 414, and an electrolyte 418 with which a region surrounded by the exterior member 402 is filled.

The negative electrode 412 includes a negative electrode current collector 420 and a negative electrode active material layer 422. The negative electrode current collector 420 and the negative electrode active material layer 422 can be any of the current collectors and active material layers described in Embodiments 1 to 3.

The positive electrode 414 includes a positive electrode current collector 424 and a positive electrode active material layer 426. The negative electrode active material layer 422 is formed on one surface or both surfaces of the negative electrode current collector 420. The positive electrode active material layer 426 is formed on one surface or both surfaces of the positive electrode current collector 424.

The negative electrode current collector 420 is connected to the terminal portion 408. The positive electrode current collector 424 is connected to the terminal portion 406.

Further, the terminal portion 406 and the terminal portion 408 each partly extend outside the exterior member 402.

Although a sealed thin power storage device is described as an example of the power storage device 400 in this embodiment, the structure of the power storage device is not limited thereto. Power storage devices having a variety of structures such as a button power storage device, a cylindrical power storage device, or a rectangular power storage device can be used as the power storage device 400, for example. Note that the power storage device 400 may have a structure where the positive electrode, the negative electrode, and the separator are rolled, without limitation to the structure where the positive electrode, the negative electrode, and the separator are stacked.

As a material of the positive electrode current collector 424, aluminum, stainless steel, or the like may be used. There is no particular limitation on the shape of the positive electrode current collector 424, and a foil shape, a plate shape, a net shape, or the like can be used.

In the case where the positive electrode active material layer 426 is a metal oxide layer containing lithium, the secondary battery can have large discharge capacity and high safety. Accordingly, for example, $LiFeO_2$, $LiCoO_2$, $LiNiO_2$, $LiMn_2O_4$, $LiFePO_4$, $LiCoPO_4$, $LiNiPO_4$, $LiMn_2PO_4$, or the like can be used as a material of the positive electrode active material layer 426. Alternatively, a lithium compound other than the above may be used as a material. Note that in the case where carrier ions are alkali metal ions other than lithium ions, or alkaline earth metal ions, the positive electrode active material layer 426 can be formed using a material in which lithium of any of the above lithium compounds is replaced with an alkali metal (e.g., Na or K) or an alkaline earth metal (e.g., Be, Mg, Ca, Sr, or Ba).

As a solute of the electrolyte 418, a material which can transfer lithium ions that are carrier ions and in which lithium ions stably exist is used. As examples of the solute of the electrolyte 418, $LiAsF_6$, $LiBF_4$, $LiPF_6$, $Li(C_2F_5SO_2)_2N$, and the like can be given. Note that in the case where carrier ions are alkali metal ions other than lithium ions, or alkaline earth metal ions, alkali metal salt containing fluorine such as sodium salt containing fluorine or potassium salt containing fluorine; alkaline earth metal salt containing fluorine such as beryllium salt containing fluorine, magnesium salt containing fluorine, calcium salt containing fluorine, strontium salt containing fluorine, or barium salt containing fluorine; or the like can be used as appropriate as the solute of the electrolyte 418.

As a solvent of the electrolyte 418, a material which can transfer lithium ions is used. As the solvent of the electrolyte 418, an aprotic organic solvent is preferably used. As examples of the aprotic organic solvent, fluoroethylene carbonate, ethylene carbonate, propylene carbonate, dimethyl carbonate, diethyl carbonate, γ-butyrolactone, acetonitrile, dimethoxyethane, and tetrahydrofuran can be given, and one of these or a mixture of any of these may be used as the solvent. When a gelled polymer is used as the solvent of the electrolyte 418, liquid leakage can be prevented and safety can be improved. Further, a structure for preventing liquid leakage can be simplified with the use of the gelled polymer, and thus the power storage device 400 can be thin and lightweight. Typical examples of the gelled polymer include a silicon gel, an acrylic gel, an acrylonitrile gel, polyethylene oxide, polypropylene oxide, a fluorine-based polymer, and the like.

Note that in the power storage device of one embodiment of the present invention, a material containing fluorine is used as the electrolyte 418.

As the separator 416, an insulator having a porous structure may be used. As examples of a material of the separator 416, cellulose (paper), polyethylene, polypropylene, and the like can be given.

The power storage device of one embodiment of the present invention may be a lithium ion capacitor.

Figure 7A:
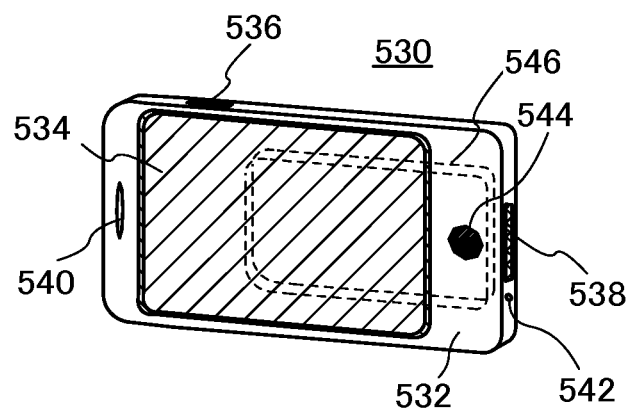
FIGS. 7A and 7B each illustrate an electronic device on which a secondary battery according to one embodiment of the present invention is mounted.
Figure 7B:
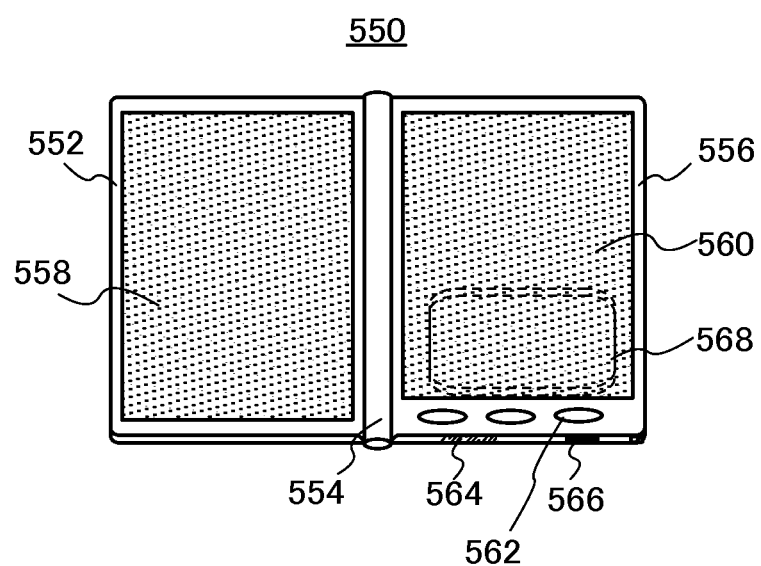

In the case where the power storage device of one embodiment of the present invention is a lithium ion capacitor, instead of the positive electrode active material layer 426 in the secondary battery illustrated in FIG. 7B, a material capable of reversibly adsorbing or absorbing at least either of lithium ions or anions may be used. As examples of a material of the positive electrode active material layer 426 in the case where the power storage device is a capacitor, active carbon, a conductive polymer, and a polyacene organic semiconductor (PAS) can be given.

In the power storage device of this embodiment, deterioration due to repetition of charge and discharge can be prevented and cycle characteristics can be improved even in the case where fluorine is contained in the solvent of the electrolyte solution. Thus, long life time can be realized.

Embodiment 5

In this embodiment, an application example of a power storage device including any of the electrodes described in Embodiments 1 to 3, i.e., the power storage device of Embodiment 4, will be described.

Figure 6:
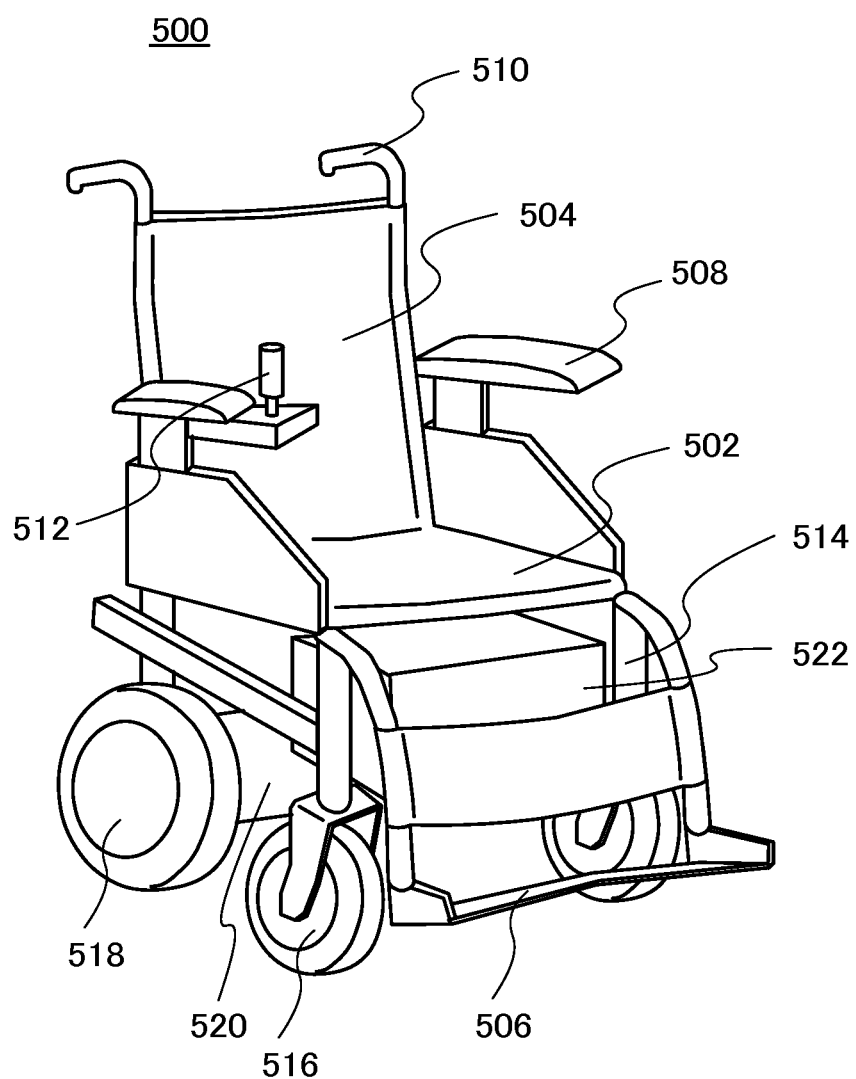
FIG. 6 illustrates an electronic appliance on which a secondary battery according to one embodiment of the present invention is mounted.

FIG. 6 is a perspective view of an electric wheelchair 500. The electric wheelchair 500 includes a seat 502 where a user sits down, a backrest 504 provided behind the seat 502, a footrest 506 provided at the front of and below the seat 502, armrests 508 provided on the left and right of the seat 502, and a handle 510 provided above and behind the backrest 504. A controller 512 for controlling operation of the wheelchair is provided for one of the armrests 508. A pair of front wheels 516 is provided at the front of and below the seat 502 through a frame 514 provided below the seat 502, and a pair of rear wheels 518 is provided behind and below the seat 502. The rear wheels 518 are connected to a driving portion 520 including a motor, a brake, a gear, and the like. A control portion 522 including a battery, a power controller, a control means, and the like is provided under the seat 502. The control portion 522 is connected to the controller 512 and the driving portion 520. The driving portion 520 is driven by the control portion 522 with the operation of the controller 512 by the user, so that the operation of moving forward, moving backward, turning around, and the like, and the speed of the electric wheelchair 500 are controlled.

The power storage device 400 described in Embodiment 4 can be used for the battery of the control portion 522. The battery of the control portion 522 can be charged by power supply from the outside using a plug-in system.

FIG. 7A illustrates an example of a mobile phone. In a mobile phone 530, a display portion 534 is incorporated in a housing 532. The housing 532 is provided with an operation button 536, an operation button 544, an external connection port 538, a speaker 540, a microphone 542, and the like. In addition, a power storage device 546 is disposed in the housing 532, and the power storage device 546 can be charged through the external connection port 538. The power storage device 400 described in Embodiment 4 can be used as the power storage device 546.

FIG. 7B illustrates an example of an e-book terminal. An e-book terminal 550 includes two housings, a first housing 552 and a second housing 556, which are combined with each other with a hinge 554. The first and second housings 552 and 556 can be opened and closed with the hinge 554 as an axis. A first display portion 558 and a second display portion 560 are incorporated in the first housing 552 and the second housing 556, respectively. In addition, the second housing 556 is provided with an operation button 562, a power switch 566, a speaker 564, and the like. A power storage device 568 is incorporated in the second housing 556 and can be charged using the power switch 566. The power storage device 400 described in Embodiment 4 can be used as the power storage device 568.

As described above in this embodiment, the power storage device of one embodiment of the present invention can be applied to a variety of devices and appliances.

Example 1

In this example, cycle characteristics of the secondary battery of Embodiment 4 including the electrode, which is one embodiment of the present invention, described in Embodiment 1 as a negative electrode were measured. The results will be described below.

First of all, a Ti foil is used as the current collector 102 of the electrode which serves as the negative electrode of this example. A silicon layer containing phosphorus is used as the silicon layer 106 which is included in the active material layer 104 provided over the current collector 102. A silicon oxide layer containing fluorine is used as the thin film layer 108 containing fluorine included in the active material layer 104. A manufacturing method of the electrode of this example is described below.

First, a 1-μm-thick silicon layer containing phosphorus was formed over the Ti foil. The silicon layer containing phosphorus was formed using a parallel-plate plasma treatment apparatus under the following conditions: the flow rates of a silane gas and a 0.5% phosphine gas (diluted with a hydrogen gas) were 60 sccm and 110 sccm, respectively, the pressure in the treatment chamber was 153 Pa, the RF power source frequency was 60 MHz, the power of the RF power source was 100 W, the pulse frequency was 20 kHz, and the duty ratio was 70%. Here, the temperatures of a heater of an upper electrode, a heater of a lower electrode, and a chamber wall of the treatment chamber were set to 400° C., 500° C., and 115° C., respectively, and the distance between the upper electrode and the lower electrode was set to 20 mm.

Next, a thin film layer containing fluorine was formed over the silicon layer containing phosphorus. The thin film layer containing fluorine was formed using a parallel-plate plasma treatment apparatus under the following conditions: the flow rates of a silane fluoride gas, a dinitrogen monoxide gas, and an argon gas were 60 sccm, 1000 sccm, and 1000 sccm, respectively, the pressure in the treatment chamber was 153 Pa, the RF power source frequency was 60 kHz, and the power of the RF power source was 800 W. Here, the temperatures of a heater of an upper electrode, a heater of a lower electrode, and a chamber wall of the treatment chamber were set to 550° C., 500° C., and 115° C., respectively, and the distance between the upper electrode and the lower electrode was set to 10 mm.

Note that, here, the deposition rate of the thin film layer containing fluorine was about 1 nm/min., and the thin film layer containing fluorine was made to contain hydrogen at $1.3 \times 10^{19}$ atoms·cm$^{-3}$ or less, fluorine at $1.0 \times 10^{20}$ atoms·cm$^{-3}$ or more, and oxygen at $1.0 \times 10^{22}$ atoms·cm$^{-3}$ or more.

Here, the distance between the upper electrode and the lower electrode was set to 10 mm in the formation of the thin film layer containing fluorine, because the fluorine in the thin film layer containing fluorine was uniformly distributed when the distance between the upper electrode and the lower electrode was 10 mm.

Figure 10:
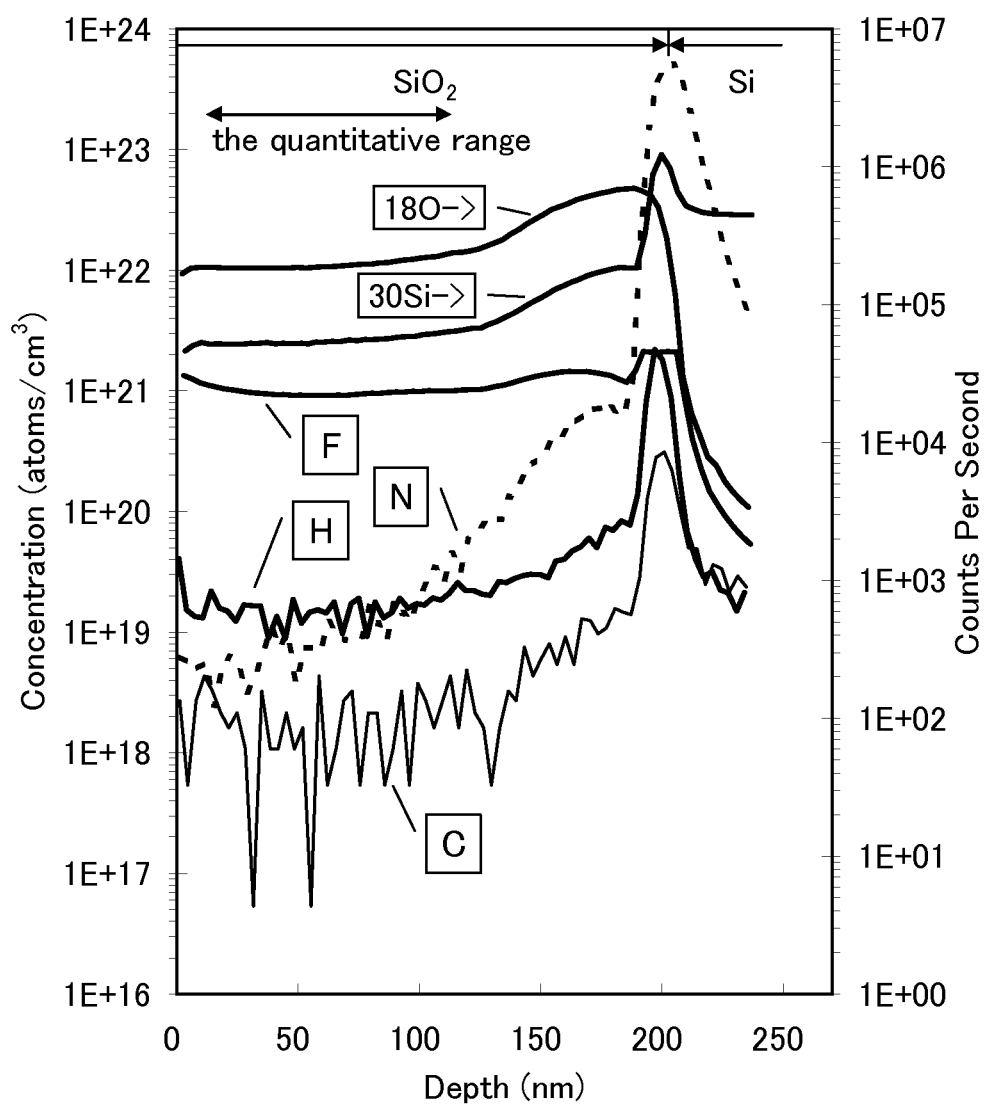
FIG. 10 shows results obtained by SIMS analysis of a negative electrode active material and a thin film layer containing fluorine of a secondary battery according to one embodiment of the present invention.
Figure 11:
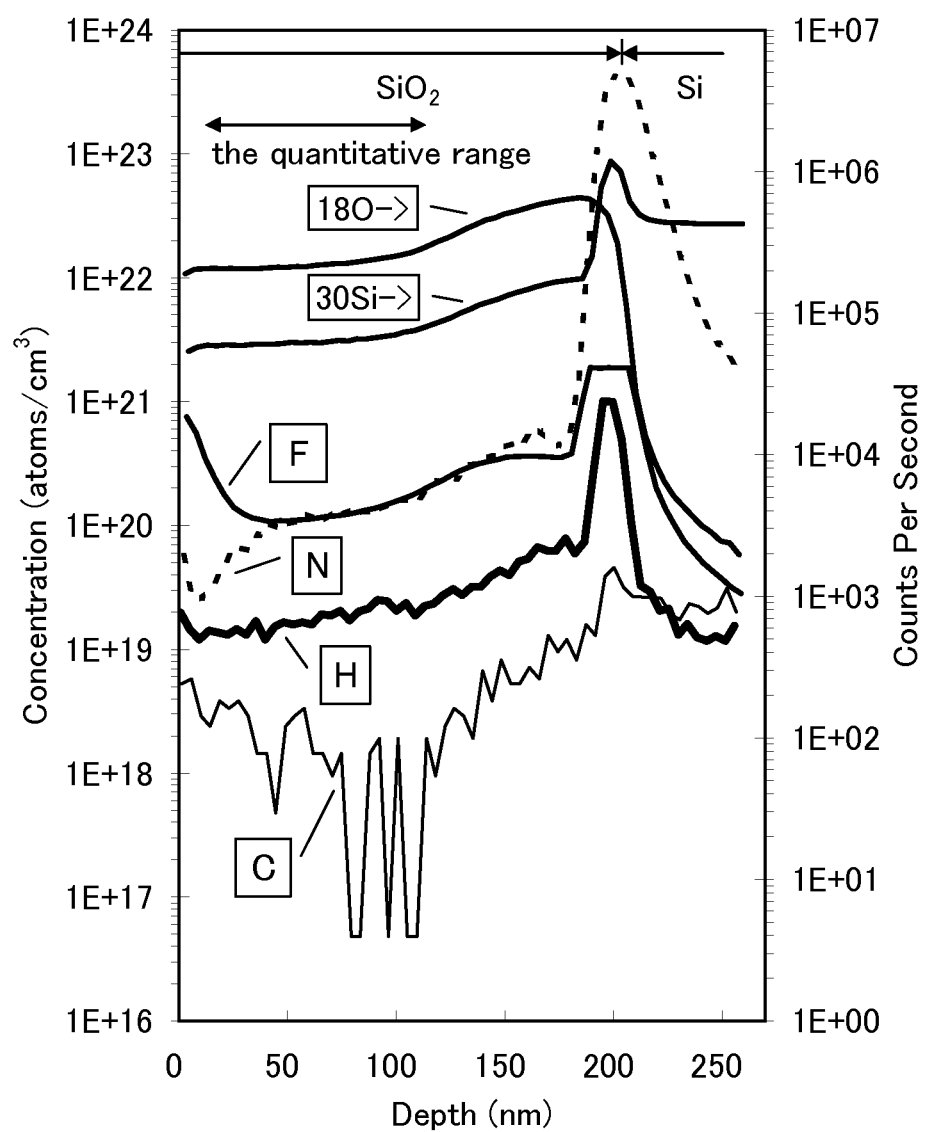
FIG. 11 shows results obtained by SIMS analysis of a negative electrode active material and a thin film layer containing fluorine of a secondary battery according to one embodiment of the present invention.

FIG. 10 shows results obtained by SIMS analysis of fluorine, hydrogen, nitrogen, carbon, oxygen, and silicon in the case where the distance between the upper electrode and the lower electrode was set to 10 mm. FIG. 11 shows results obtained by SIMS analysis of fluorine, hydrogen, nitrogen, carbon, oxygen, and silicon in the case where the distance between the upper electrode and the lower electrode was set to 7 mm. In comparison between FIG. 10 and FIG. 11, it is found that fluorine was more uniformly distributed in the case where the distance between the upper electrode and the lower electrode was set to 10 mm than in the case where the distance was set to 7 mm.

Then, a coin cell was manufactured using the above electrode as an electrode, an Li metal foil as a reference electrode, polypropylene as a separator, and a solution in which ethylene carbonate and diethyl carbonate were mixed at a ratio of 1:1 into which 1 mol of $LiPF_6$ was mixed, as an electrolyte solution.

Measurement was performed on the secondary battery manufactured in the above manner, using a charge-discharge measuring instrument. For the measurement of charge and discharge, a constant current mode was employed, and charge and discharge were performed with a current of 0.05 mA in initial charge and 0.15 mA in charge after the initial charge, with the upper limit voltage of 1.0 V and the lower limit voltage of 0.03 V.

In this example, four kinds of coin cells were manufactured: a first coin cell in which the thickness of a thin film layer containing fluorine was 7 nm, a second coin cell in which the thickness of a thin film layer containing fluorine was 11 nm, a third coin cell in which the thickness of a thin film layer containing fluorine was 41 nm, and a fourth coin cell in which no thin film layer containing fluorine was provided. As for the thicknesses of the thin film layers containing fluorine, the thin film layers containing fluorine formed over a silicon wafer under the same condition were measured with a spectroscopic ellipsometer.

Figure 8:
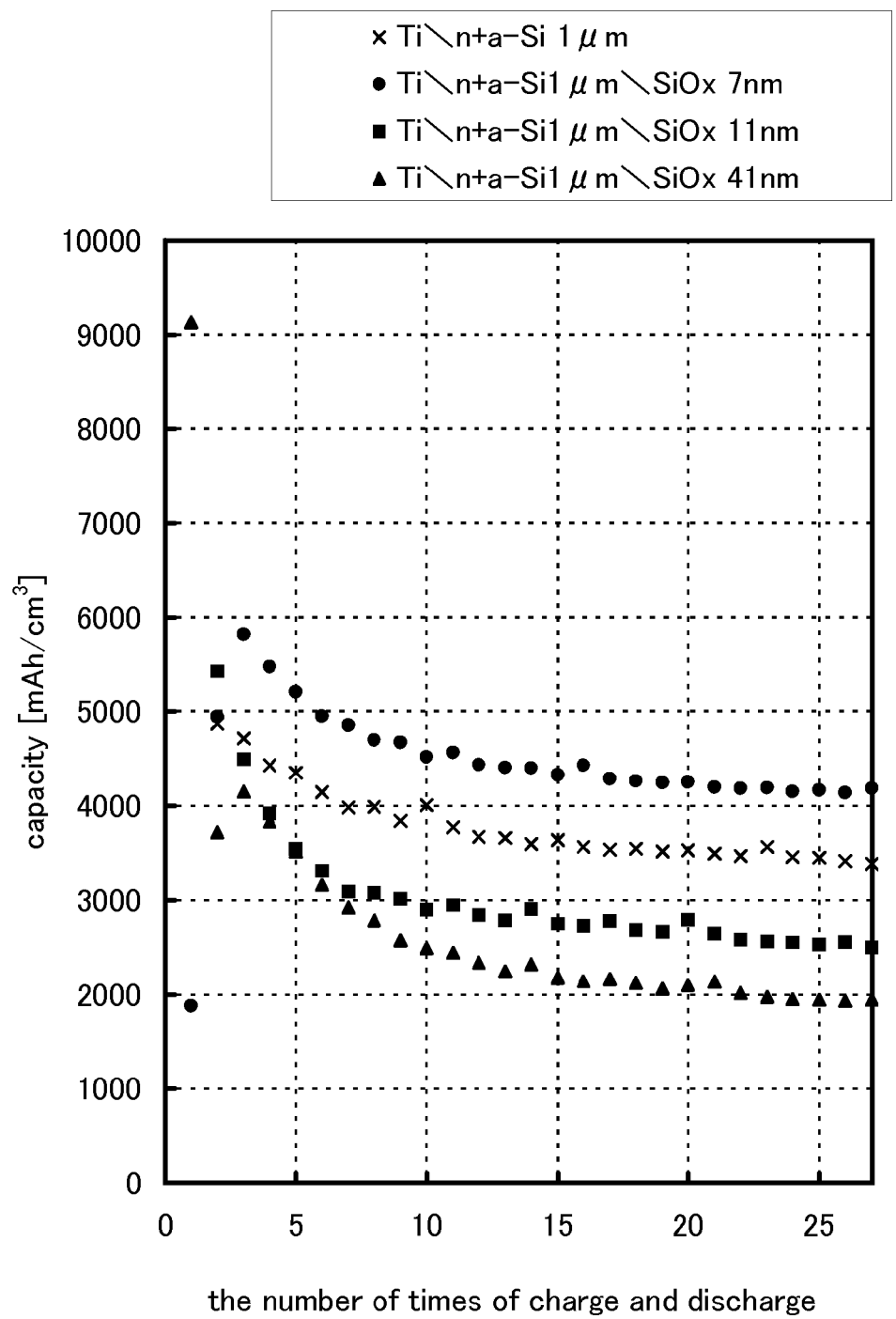
FIG. 8 shows cycle characteristics of a secondary battery according to one embodiment of the present invention.

FIG. 8 shows the comparison of measurement results of cycle characteristics of these four coin cells. According to FIG. 8, the cycle characteristics of the first coin cell (the thickness of the thin film layer containing fluorine was 7 nm) were the highest. In addition, the second coin cell had lower cycle characteristics than the fourth coin cell. Note that in the calculation of discharge capacity of each secondary battery, the volume of the active material layer was calculated assuming that the thickness thereof was 1.0 μm and the diameter thereof was 12 mm.

Figure 9:
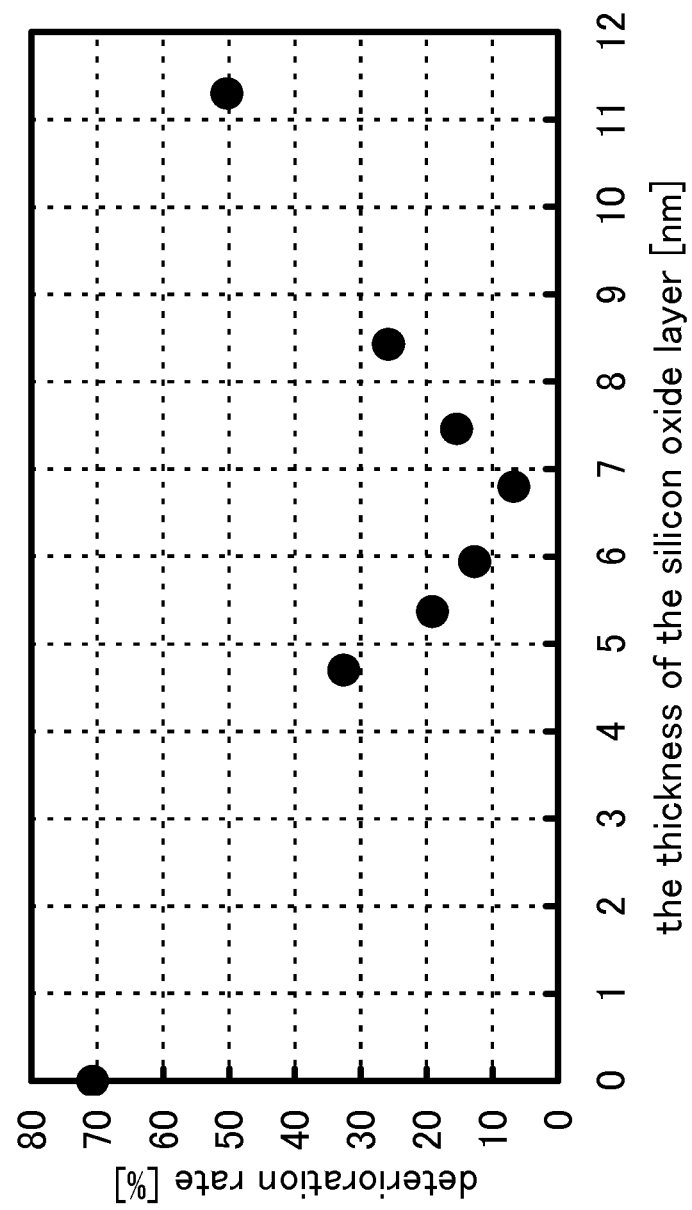
FIG. 9 shows the relation between the deterioration rate and the thickness of a thin film layer of a secondary battery according to one embodiment of the present invention.

FIG. 9 shows measurement results of cycle characteristics of a plurality of samples with different thicknesses of the thin film layers containing fluorine. Here, in FIG. 9, the thicknesses of the thin film layers containing fluorine were 0 nm, 4.7 nm, 5.37 nm, 5.94 nm, 6.8 nm, 7.46 nm, 8.43 nm, and 11.3 nm. As for the thicknesses of the thin film layers containing fluorine, the thin film layers containing fluorine formed over a silicon wafer under the same condition were measured with a spectroscopic ellipsometer.

The deterioration rates were calculated from the difference between lithium discharge capacity in the second charge and discharge and that in the fifteenth charge and discharge.

Note that as for the mass of the active material layer of the secondary battery, the active material layer formed over a Ti sheet with a diameter of 12 mm was measured, whereby the mass was calculated. Accordingly, this mass includes the mass of the thin film layer containing fluorine. Discharge capacity (mA·h/g) was calculated from this mass.

According to FIG. 9, the deterioration rate was the lowest in the case where the thickness of the thin film layer containing fluorine was 6.8 nm.

According to FIG. 8 and FIG. 9, the thickness of the thin film layer containing fluorine may be greater than 0 nm and less than or equal to 10 nm, preferably greater than or equal to 4 nm and less than or equal to 9 nm, most preferably 7 nm. When the thickness of the thin film layer containing fluorine is in the above range, a secondary battery with high cycle characteristics and low deterioration rate can be obtained.

This application is based on Japanese Patent Application serial no. 2010-280754 filed with Japan Patent Office on Dec. 16, 2010, the entire contents of which are hereby incorporated by reference.

What is claimed is:

1. An active material comprising:
    a silicon layer comprising a crystalline silicon region and a whisker-like crystalline silicon region over the crystalline silicon region; and
    a silicon oxide layer containing fluorine with a thickness of greater than 4 nm and less than or equal to 9 nm over the silicon layer,
    wherein afluorine concentration of the silicon oxide layer is $5.0 \times 10^{19}$ atoms·cm$^{-3}$ or higher.

2. The active material according to claim 1, wherein the silicon layer contains a conductivity impurity.

3. The active material according to claim 1, wherein a nitrogen concentration of the silicon oxide layer is $6.0 \times 10^{20}$ atoms·cm$^{-3}$ or lower.

4. The active material according to claim 1, wherein a hydrogen concentration of the silicon oxide layer is $1.0 \times 10^{20}$ atoms·cm$^{-3}$ or lower.

5. An electrode comprising the active material according to claim 1 over a current collector.

6. A secondary battery comprising:
    a positive electrode;
    a negative electrode comprising:
    a current collector;
    a silicon layer comprising a crystalline silicon region and a whisker-like crystalline silicon region over the crystalline silicon region, the silicon layer being over the current collector; and
    a silicon oxide layer containing fluorine with a thickness of greater than 4 nm and less than or equal to 9 nm over the silicon layer; and
    an electrolyte solution containing fluorine between the positive electrode and the negative electrode,
    wherein a fluorine concentration of the silicon oxide layer is $5.0 \times 10^{19}$ atoms·cm$^{-3}$ or higher.

7. The secondary battery according to claim 6, wherein the current collector contains Pt, Al, Cu, Ti, or Al alloy.

8. The secondary battery according to claim 6, wherein the electrolyte solution containing fluorine contains lithium.

9. The secondary battery according to claim 6, wherein the silicon layer contains a conductivity impurity.

10. The secondary battery according to claim 6, wherein a nitrogen concentration of the silicon oxide layer is $6.0 \times 10^{20}$ atoms·cm$^{-3}$ or lower.

11. The secondary battery according to claim 6, wherein a hydrogen concentration of the silicon oxide layer is $1.0 \times 10^{20}$ atoms·cm$^{-3}$ or lower.

* * * * *